(12) United States Patent
Dodds

(10) Patent No.: US 11,242,912 B2
(45) Date of Patent: Feb. 8, 2022

(54) CHAIN FASTENING ASSEMBLY

(71) Applicant: John Dodds, Newbern, TN (US)

(72) Inventor: John Dodds, Newbern, TN (US)

(*) Notice: Subject to any disclaimer, the term of this patent is extended or adjusted under 35 U.S.C. 154(b) by 434 days.

(21) Appl. No.: 16/274,389

(22) Filed: Feb. 13, 2019

(65) Prior Publication Data

US 2020/0256427 A1 Aug. 13, 2020

(51) Int. Cl.
*F16G 15/04* (2006.01)

(52) U.S. Cl.
CPC .................... *F16G 15/04* (2013.01)

(58) Field of Classification Search
CPC ................... F16G 13/12; F16G 15/04
See application file for complete search history.

(56) References Cited

U.S. PATENT DOCUMENTS

| | | | |
|---|---|---|---|
| 1,415,328 A | 5/1922 | Forseth | |
| 1,471,835 A | 10/1923 | Detwiler | |
| 1,668,325 A | 5/1928 | Kreutz | |
| 2,877,621 A * | 3/1959 | Robbins | F16G 15/04 59/88 |
| 3,575,458 A | 4/1971 | Crooks | |
| 4,013,314 A | 3/1977 | Archer | |
| 4,121,867 A | 10/1978 | Muller | |
| 4,559,890 A * | 12/1985 | Regalbuto | B23K 7/00 114/221 R |
| 6,941,622 B1 | 9/2005 | Hung | |
| 8,161,723 B2 * | 4/2012 | de Vries | F16G 13/14 59/78 |
| 9,169,900 B1 * | 10/2015 | Moreau | F16G 15/06 |
| 2005/0039309 A1 * | 2/2005 | McCauley | B60D 1/18 24/299 |
| 2011/0265442 A1 * | 11/2011 | Segura | B66C 1/10 59/86 |
| 2013/0240692 A1 * | 9/2013 | Lahey | E05C 17/365 248/205.1 |

* cited by examiner

*Primary Examiner* — David M Upchurch

(57) ABSTRACT

A chain fastening assembly includes a fastener that has a first loop and a second loop. The first loop has a clevis that is attached to a chain being releasably fastened to the first loop. Additionally, the first loop has a diameter that is sufficient to have a chain link passed therethrough regardless of the orientation of the chain link. The second loop has an inside diameter being sufficient to have a chain link passed therethrough when the chain link is oriented to lie on a vertical plane. Thus, the chain link can be passed into the second loop. Moreover, the second loop has an inside diameter being insufficient to allow the chain link to pass therethrough when the chain link is oriented to lie on a horizontal plane. In this way the fastener retains the chain in a closed loop for towing or the like.

7 Claims, 2 Drawing Sheets

CHAIN FASTENING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to fastening devices and more particularly pertains to a new fastening device for securing a chain into a closed loop.

BRIEF SUMMARY OF THE INVENTION

An embodiment of the disclosure meets the needs presented above by generally comprising a fastener that has a first loop and a second loop. The first loop has a clevis that is attached to a chain being releasably fastened to the first loop. In this way a chain can be attached to the first loop. Additionally, the first loop has a diameter that is sufficient to have a chain link passed therethrough regardless of the orientation of the chain link. The second loop has an inside diameter being sufficient to have a chain link passed therethrough when the chain link is oriented to lie on a vertical plane. Thus, the chain link can be passed into the second loop. Moreover, the second loop has an inside diameter being insufficient to allow the chain link to pass therethrough when the chain link is oriented to lie on a horizontal plane. In this way the fastener retains the chain in a closed loop for towing or the like.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
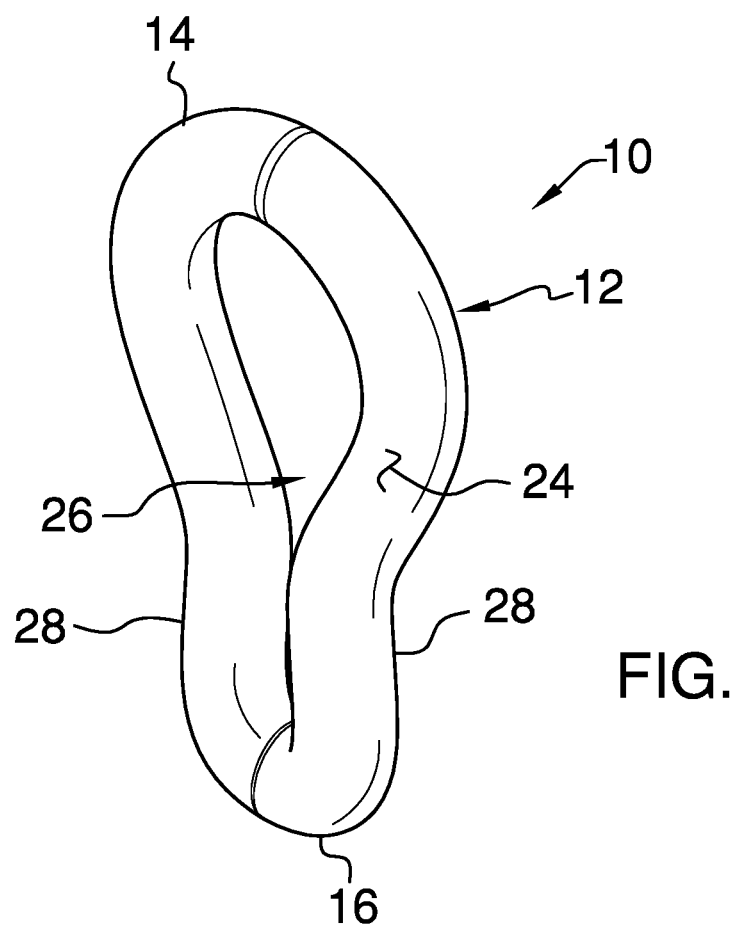
FIG. 1 is a front perspective view of a chain fastening assembly according to an embodiment of the disclosure.
Figure 2:
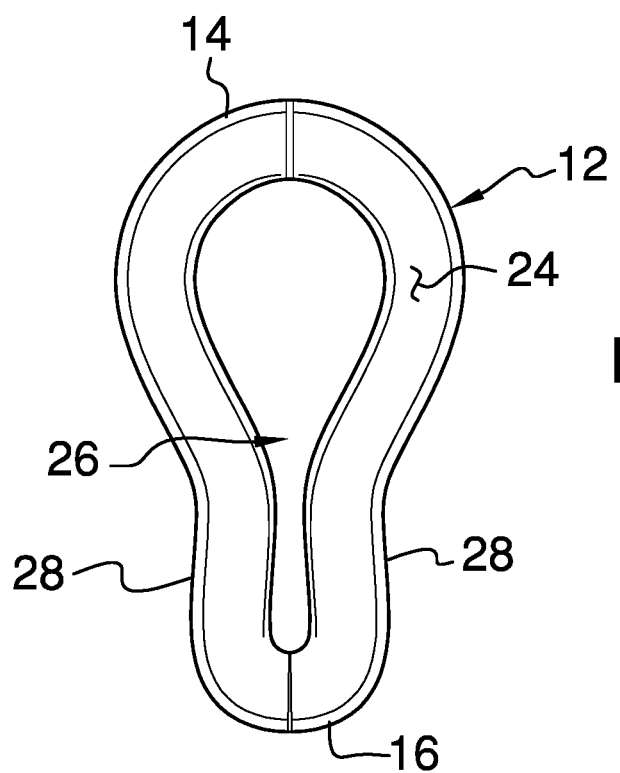
FIG. 2 is a front view of an embodiment of the disclosure.
Figure 3:
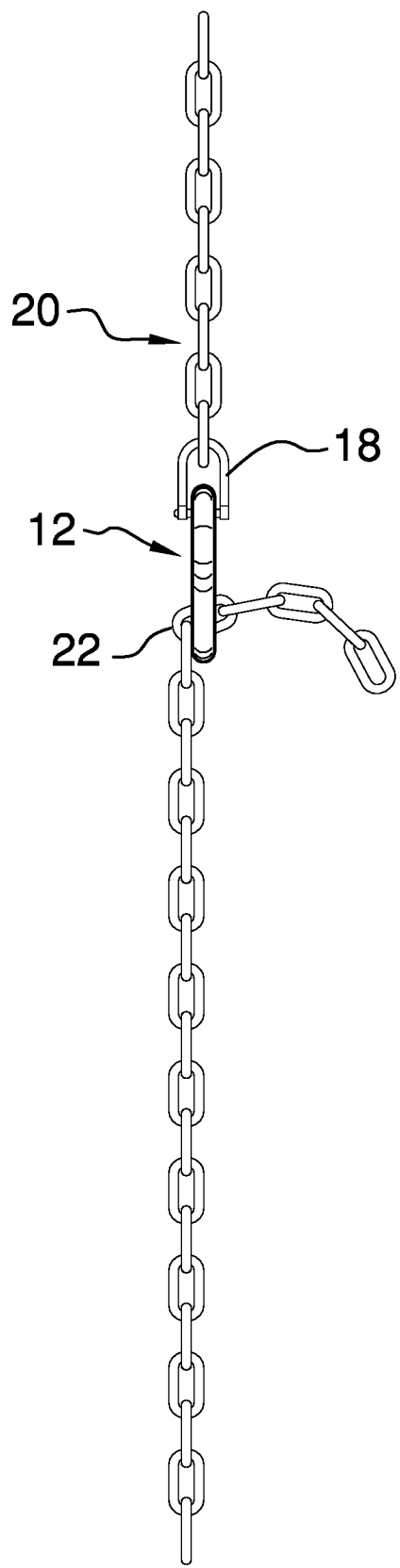
FIG. 3 is a perspective in-use view of an embodiment of the disclosure.

With reference now to the drawings, and in particular to FIGS. 1 through 3 thereof, a new fastening device embodying the principles and concepts of an embodiment of the disclosure and generally designated by the reference numeral 10 will be described.

As best illustrated in FIGS. 1 through 3, the chain fastening assembly 10 generally comprises a fastener 12 has a first loop 14 and a second loop 16. The first loop 14 has a clevis 18, or other releasable fastener commonly found on a chain 20, being releasably fastenable to the first loop 14. In this way the first loop 14 can be secured to the chain 20. The chain 20 may be a log chain or any other type of metallic chain that is commonly employed for towing or lifting. Additionally, the fastener 12 is comprised of a metallic material thereby facilitating the fastener 12 to carry a tension load that is placed on the chain 20.

The first loop 14 has a diameter is sufficient to have a chain link 22 passed therethrough regardless of the orientation of the chain link 22. The second loop 16 has an inside diameter that is sufficient to have a chain link 22 passed therethrough when the chain link 22 is oriented to lie on a vertical plane. In this way the chain link 22 on the vertical plane can be passed into the second loop 16 for subsequently attaching the chain 20 to the fastener 12. The second loop 16 has an inside diameter that is insufficient to allow the chain link 22 to pass therethrough when the chain link 22 is oriented to lie on a horizontal plane. In this way the fastener 12 retains the chain 20 in a closed loop for towing or the like.

The fastener 12 has an outer surface 24, the outer surface 24 is continuously arcuate such that the fastener 12 has a tubular shape and the fastener 12 is continuous such that the fastener 12 forms a closed loop. The fastener 12 curves outwardly from each side of a center point 26 of the fastener 12 to define the first loop 14 extending upwardly from the center point 26 of the fastener 12. Additionally, the fastener 12 has a pair of straight sections 28 each extending downwardly from the center point 26. The straight sections 28 are spaced apart from each other a distance sufficient to have the chain link 22 pass therethrough when the chain link 22 is oriented to lay on the vertical plane.

The fastener 12 curves between each of the straight sections 28 to define the second loop 16, and the second loop 16 is distally positioned with respect to the center point 26. Each of the straight sections 28 are spaced apart from each other a distance that is insufficient to have the chain link 22 pass between the straight sections 28 when the chain link 22 is oriented to lie on the horizontal plane. In this way the chain link 22 in the vertical plane is inhibited from passing through the second loop 16 when tension is applied to the chain 20 thereby retaining the chain 20 in the closed loop that the chain 20 forms for towing or the like.

The chain link 22 that is oriented on the vertical plane is positioned to lay on the second loop 16. Additionally, the chain link 22 that is oriented on the vertical plane is positioned between each of the straight sections 28. The chain link 22 lying on the vertical plane can be lifted upwardly into the first loop 14. In this way the chain 20 can be drawn through the first loop 14 for removing the chain 20 from the fastener 12.

In use, the clevis 18, or other similar releasable fastener 12 commonly employed on a chain 20, is coupled to the first loop 14 of the fastener 12. An end of a chain 20 is drawn through the first loop 14 of the fastener 12 when the chain 20 has been looped through an attachment to a load or the like. The chain 20 is drawn to a selected tightness, a selected one of the chain links 22 is positioned on the vertical plane and slid downwardly between the straight sections 28 of the fastener 12 to rest on the second loop 16. In this way adjacent chain links are oriented in the horizontal plane and are thusly inhibited from passing between the straight sections 28. Thus, the chain 20 cannot be drawn through the fastener 12 when tension is applied to the chain 20 thereby facilitating the load to be lifted or towed. Moreover, the chain 20 is inhibited from binding in the fastener 12 once tension is applied to the chain 20, thereby facilitating the chain 20 to be easily lifted upwardly into the first loop 14 for subsequent removal from the fastener 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chain fastening assembly being configured to releasably fasten a chain into a closed loop, said assembly comprising:
a chain having a plurality of chain links;
a fastener having a first loop and a second loop, a clevis extending through said first loop wherein said first loop is configured to be secured to the chain by the clevis, said first loop having a diameter being sufficient to have a chain link of the plurality of chain links passed therethrough while the clevis extends through the first loop regardless of the orientation of the chain link, said second loop having an inside diameter being sufficient to have a chain link inserted into said second loop from said first loop, said second loop having an inside diameter being less than a width of adjacent chain links to the chain link inserted in said second loop whereby the adjacent chain links are prevented from passing through said second loop, wherein said fastener is configured to retain the chain in a closed loop for towing.

2. The assembly according to claim 1, wherein:
said fastener has an outer surface, said outer surface being continuously arcuate that that said fastener has a tubular shape, said fastener being continuous such that said fastener forms a closed loop; and
said fastener curving outwardly from each side of a center point of said fastener to define said first loop extending upwardly from said center point of said fastener.

3. The assembly according to claim 2, wherein said fastener has a pair of straight sections each extending downwardly from said center point and being spaced apart from each other a distance sufficient to have the chain link pass therethrough when the chain link is oriented to lie on a vertical plane, said fastener curving between each of said straight sections to define said second loop, said second loop being distally positioned with respect to said center point.

4. The assembly according to claim 3, wherein each of said straight sections is spaced apart from each other a distance being insufficient to have the chain link pass between said straight sections when the chain link is oriented to lie on said horizontal plane thereby inhibiting the chain from passing through said second loop when tension is applied to the chain wherein said fastener is configured to retain the chain in the closed loop that the chain forms for towing.

5. The assembly according to claim 3, wherein the chain link that is oriented to lay on said vertical plane rests on said second loop having the chain link being oriented on said vertical plane being positioned between each of said straight sections.

6. The assembly according to claim 5, wherein the chain link lying on said vertical plane is liftable upwardly into said first loop wherein said fastener is configured to have the chain drawn therethrough for removing the chain from said fastener.

7. A chain fastening assembly being configured to releasably fasten a chain into a closed loop, said assembly comprising:
a chain having a plurality of chain links;
a fastener having a first loop and a second loop, a clevis extending through said first loop wherein said first loop is configured to be secured to the chain by the clevis, said first loop having a diameter being sufficient to have a chain link of the plurality of chain links passed therethrough regardless of the orientation of the chain link, said second loop having an inside diameter being sufficient to have a chain link inserted into said second loop from said first loop, said second loop having an inside diameter being less than a width of adjacent chain links to the chain link inserted in said second loop whereby the adjacent chain links are prevented from passing through said second loop, wherein said fastener is configured to retain the chain in a closed loop for towing, said fastener having an outer surface, said outer surface being continuously arcuate that said fastener has a tubular shape, said fastener being continuous such that said fastener forms a closed loop, said fastener curving outwardly from each side of a center point of said fastener to define said first loop extending upwardly from said center point of said fastener, said fastener having a pair of straight sections each extending downwardly from said center point and being spaced apart from each other a distance sufficient to have the chain link pass therethrough when the chain link is oriented to lie on said vertical plane, said fastener curving between each of said straight sections to define said second loop, said second loop being distally positioned with respect to said center point, each of said straight sections being spaced apart from each other a distance being insufficient to have the chain link pass between said straight sections when the chain link is oriented to lie on said horizontal plane thereby inhibiting the chain from passing through said second loop when tension is applied to the chain, wherein said fastener is configured to retain the chain in the closed loop that the chain forms for towing, the chain link being oriented to lie on said vertical plane lying on said second loop having the chain link being oriented on said vertical plane being positioned between each of said straight sections, the chain link lying on said vertical plane being liftable upwardly into said first loop wherein said fastener is configured to have the chain drawn therethrough for removing the chain from said fastener.

\* \* \* \* \*